(12) United States Patent
Weiner et al.

(10) Patent No.: US 7,865,878 B2
(45) Date of Patent: Jan. 4, 2011

(54) METHOD AND APPARATUS FOR OPERATING ENTERPRISE SOFTWARE FROM A DETACHABLE STORAGE DEVICE

(75) Inventors: Aharon Weiner, Tel Aviv (IL); Yoav Reich, Ramat Gan (IL); Eyal Melamed, Tel Aviv (IL); Igal Sapir, Raanana (IL); Udi Ziv, Raanana (IL)

(73) Assignee: SAP AG, Walldorf (DE)

( * ) Notice: Subject to any disclaimer, the term of this patent is extended or adjusted under 35 U.S.C. 154(b) by 1192 days.

(21) Appl. No.: 11/496,137

(22) Filed: Jul. 31, 2006

(65) Prior Publication Data

US 2008/0126791 A1   May 29, 2008

(51) Int. Cl.
*G06F 9/44* (2006.01)
(52) U.S. Cl. .................... 717/122; 717/120; 717/121
(58) Field of Classification Search .......... None
See application file for complete search history.

(56) References Cited

U.S. PATENT DOCUMENTS

| | | | |
|---|---|---|---|
| 5,606,668 A | 2/1997 | Shwed | |
| 5,835,726 A | 11/1998 | Shwed et al. | |
| 6,496,935 B1 | 12/2002 | Fink et al. | |
| 6,850,943 B2 | 2/2005 | Teixeira et al. | |
| 6,873,988 B2 | 3/2005 | Herrmann et al. | |
| 2005/0075115 A1* | 4/2005 | Corneille et al. ......... 455/456.3 | |
| 2006/0029109 A1 | 2/2006 | Moran | |

FOREIGN PATENT DOCUMENTS

| | | |
|---|---|---|
| WO | WO 03/077053 | 9/2003 |
| WO | WO 2006/044201 | 4/2006 |

\* cited by examiner

*Primary Examiner*—Chuck O Kendall
(74) *Attorney, Agent, or Firm*—Buckley, Maschoff & Talwalkar LLC

(57) ABSTRACT

A method and apparatus for enabling an application to run from a detachable device attached to a host computer, the method comprising eliminating the usage of the registry of the computer, and using relative file paths. These modifications enable organization applications, and particularly database applications to be installed and run from a smart drive.

16 Claims, 7 Drawing Sheets

```xml
<?xml version="1.0" encoding="UTF-8?">                                    340
<!DOCTYPE configuration SYSTEM "c:/temp/b1-conf.dtd">
<configuration>
 <node name="REGISTRY">
   <node name="HKEY_CURRENT_USER <"
    <node name="SOFTWARE">
     <node name="A1">                                                      342
      <node name="A1 Manage">
       <node name="A1 Business ">
        <node name="LogIN">                                                344
         <leaf kind="single" name="Server" type="Binary">
             <value>c:\temp\LogIN-Server.binary</value>
         </leaf>
         <leaf kind="single" name="Company" type="Binary">                 348
             <value>c:\temp\LogIN-Company.binary</value>
         </leaf>
         <leaf kind="single" name="Driver" type="Binary">
             <value>c:\temp\LogIN-Driver.binary</value>
         </leaf>
         <leaf kind="single" name="Trusted" type="Binary">
             <value>c:\temp\LogIN-Trusted.binary</value>
         </leaf>
         <leaf kind="single" name="Language" type="String">                352
             <value>English</value>
         </leaf>
        </node>
        <leaf kind="single" name="CFLMark" type="String"> <value>N</value>
        </leaf>
        <leaf kind="single" name="Charset" type="String"> <value>0</value>
        </leaf>
        <leaf kind="single" name="Com_Ok" type="String"> <value>Y</value>
        </leaf>
       </node>
      </node>
     </node>
    </node>
   </node>
 </node>
</configuration>
```

Fig. 3B

TwBsAGMAcAAAAA==         360

Fig. 3C

METHOD AND APPARATUS FOR OPERATING ENTERPRISE SOFTWARE FROM A DETACHABLE STORAGE DEVICE

BACKGROUND OF THE INVENTION

1. Field of the Invention

The present invention relates to a method and apparatus for providing enterprise solution on a portable device having a flash memory.

2. Discussion of the Related Art

Flash drives generally consist of a small sized printed circuit board encased in a robust plastic or metal casing, making the drive sturdy enough to be carried about in a pocket, as a key fob, or the like. Most flash drives feature a standard USB connection allowing them to be connected directly to a port on a personal computer or to a hub. Classic flash drives are used merely for storage purposes, supplying portable storage for music, documents or other static data files. However, flash drives adhering to a standard, such as U3 by U3 LLC, California, USA are sometimes called "smart drives" and provide more than storage. Smart drives differ from traditional flash drives since they include installed software with a launch pad, which emulates a desktop or a part thereof, such as a Windows operating system "start" menu, and enables the execution of various applications installed on the device. Applications adhering to a specific application design specification, such as the U3 standard can be packaged and applied to a smart drive. When such a device is connected to a personal computer or a hub, any of the installed applications can be executed directly from the launch pad of the device, without further installation on the host computer. Furthermore, the application will run seamlessly even if it was never installed on the host computer. A user can then use any of the pre-installed applications, and can practice reading, creating or saving data using the applications. The installed applications are not allowed to write to the registry nor to run services on the host computer. In the context of the disclosed invention, the term registry generally refers to a database of all configuration settings in the Microsoft Windows operating systems in all Windows NT based operating systems and also in home-based versions from Windows 95 onwards. The registry also contains all the data relevant to running services, wherein the term service generally refers to a background computer program in multitasking operating systems. Once the smart drive connected to a host computer is removed, all applications and data associated with the smart device and the applications launched there from are removed from the host computer without leaving any traces. Thus, if the application was not installed on the host computer prior to using the device, the application, including all related data remains uninstalled and unavailable to a user of the host computer after the device has been removed.

However, the proper execution of many applications depends among other things, on permissions to create or modify files or registry entries. If an application needs to modify areas for which administrator privileges are required, than such application will not function properly, if at all, when a user does not have such permissions. This inherently limits the type of applications that can be run from a smart drive, to applications that can be installed and run by a user having non-administrator privileges or permissions, such as personal productivity tools, personal communication tools, or other simple programs. Yet another limitation results from the requirement for timely responsiveness of the device. A typical user will not be willing to wait for a long installation of the application. Thus, only files associated with relatively small applications can be copied or installed on the host computer and run from there once a smart drive is connected to the computer. Other programs must be run directly from the device. If an application is to be run directly from the device, another problem presents itself, being addressing a specific file associated with the application. When a device is inserted into a computer, it can not be guaranteed the device will always be assigned the same disk letter (e.g. "F:"), even for the same device-computer combination. Moreover, file paths may be associated with the user's name or with other factors that may change according to circumstances. The changes impose a limitation on using file names, since any attempt to address a file via its full file path might result in an error and inoperability of the application. The combination of the above mentioned problems, being the user privileges, the time limitations on copying files to a local disk, and file paths, cause a serious problem to developers or users wishing to deploy a relatively large application, such as an enterprise solution from a smart drive. Many enterprise applications involve usage of databases, or otherwise require complex installation, which is typically performed by an administrator, having to provide multiple parameters and choose among multiple options. Such applications may also imply a long customization and assimilation process of the application within an organization. These requirements set a significant barrier on the deployment of such applications in small-to-medium businesses, and intimidate prospective users from trying such products.

There is therefore a need for a solution which will enable the immediate deployment of enterprise applications from a smart drive, thus eliminating the need of complex installations or administrator privileges. Such solution should decrease a user's time to value and total cost of ownership and thus increase the willingness of small-to-medium businesses to try and adopt enterprise solutions.

SUMMARY OF THE PRESENT INVENTION

The present invention provides a novel method and apparatus for detecting performance deficiencies of an operational environment.

In an exemplary embodiment of the present invention, enabling an application to run from a detachable device attached to a host computer is accomplished through eliminating the usage of the host computer registry by enterprise applications through the substitution of addressing the registry, by addressing another hierarchical structure a registry substitute In an exemplary embodiment of the present invention, such hierarchical structure is one or more XML Files which is not a part of the computer's registry.

In an exemplary embodiment of the invention the hierarchical structure is a registry substitute.

In an exemplary embodiment of the present invention, there is provided a mechanism for the reading of such hierarchical structure and relaying the information therein to enterprise software launched from a smart drive (detachable device).

In an exemplary embodiment of the present invention, when a smart drive is removed or ejected, such hierarchical structure and optionally any other element for its launch, handling and management is removed from the host computer.

In an exemplary embodiment of the present invention a registry interface is used to store or retrieve information in the registry according to the user's privileges.

In an exemplary embodiment of the present invention the application makes calls to the registry substitute, instead of to the host computer's registry.

In an exemplary embodiment of the present invention a registry substitute optionally provides registry calling code with the same interface as provided by registry interface.

In an exemplary embodiment of the present invention, entries within the registry substitute comprise a reference to a file comprising relevant data.

In an exemplary embodiment of the present invention, enabling an application to run from a detachable device attached to a host computer is accomplished through the usage of dynamically given drive assignment of the smart drive.

In an exemplary embodiment of the present invention, enabling an application to run from a detachable device attached to a host computer is accomplished by having the enterprise application working with relative paths.

In an exemplary embodiment of the present invention, the smart drive comprises a computer program stored on the smart drive called a launcher providing when executed a menu presenting applications which can be launched to the host computer by the user, said menu comprising enterprise software.

In an exemplary embodiment of the present invention, enterprise applications are launched from the smart drive, executed on the host computer and removed along with any associated data from said host computer.

In an exemplary embodiment of the present invention, when an enterprise application launched from the smart drive is required to relate to a file, it retrieves or otherwise receives one or more values representing one or more parts of a file's path from a location, such as the registry or registry substitution files.

In an exemplary embodiment of the present invention, the retrieved file is combined with the relative part to complete the full path of the file required.

In an exemplary embodiment of the present invention the elimination of relative paths and registry substitution results in smooth and seamless installation of applications in general, and enterprise application in particular.

In an exemplary embodiment of the invention, the enterprise application is a server-client application associated with one or more databases.

In an exemplary embodiment of the invention, the server and client, including the application's one or more databases, are launched from the smart drive and executed by the host computer.

There is thus provided in accordance with an exemplary embodiment of the present invention a method for enabling an enterprise application to run from a detachable device attached to a host computer, said detachable device can be detached from the host computer and used as a storage device, the method comprising the step of substituting addressing the registry of the host computer by addressing a hierarchical structure.

Optionally, the hierarchical structure is a registry substitute.

Optionally, the hierarchical structure is an XML file.

Optionally, the method further comprising the step of reading of the hierarchical structure and relaying the information therein to enterprise software launched from the detachable device.

Optionally, the method further comprises the step of removing the detachable device from the host computer and subsequently removing the hierarchical structure and any data related to the enterprise application from the host computer.

Optionally, the enterprise application makes calls to the hierarchical structure, instead of to the host computer's registry.

Optionally, the hierarchical structure comprises a reference to a file comprising data associated with said value.

Optionally, the method further comprises the step of dynamically assigning a drive indication to the detachable device.

Optionally, one or more references to a variable are substituted with one or more references to the dynamically assigned drive indication.

Optionally, one or more references to a variable are substituted with one or more references to the dynamically assigned drive indication combined with one or more relative parts.

Optionally, the one or more relative parts can be one or more relative file paths.

Optionally, the one or more variables can be one or more file locations or a part thereof.

Optionally, the enterprise application is a client-server application associated with one or more databases.

There is thus provided in accordance with an exemplary embodiment of the invention a method for enabling an application to run from a detachable device attached to a host computer, the method comprising substituting one or more calls made by the application, from a call to a first configuration holding component associated with the host computer, to a call to a second configuration holding component; receiving one or more values for an at least one first variable; and substituting one or more references to a second variable with a reference to a third variable, the third variable comprising the first variable and a relative part.

Optionally, the application is an enterprise application.

Optionally, the configuration holding component associated with the computer is a registry.

Optionally, the second configuration holding component is an XML reader.

Optionally, the first variable is a predetermined path of a file or a folder, the second variable is a path of a folder, and the relative part is a relative path of a file or a folder.

Optionally, the host computer is one of the following: a personal computer, a hand held computing device, a server.

Optionally, the method further comprises a step of uploading one or more of the following to an Internet site: a generally available version of a software application, a trial version of a software application, a promotional version of a software application, an evaluation version of a software application, an update of a software application, a patch to a software application.

There is thus provided in accordance with an exemplary embodiment of the invention an apparatus for enabling one or more applications to run from a detachable device attached to a host computer, said detachable device can be detached from the host computer and used as a storage device, the apparatus comprising a set of instructions for substituting an at least one call made by the application, from a call to a first configuration holding component associated with the host computer, to a call to a second configuration holding component;

There is thus provided in accordance with an exemplary embodiment of the invention an apparatus for enabling one or more applications to run from a detachable device attached to a host computer, said detachable device can be detached from the host computer and used as a storage device, the apparatus comprising a set of instructions for receiving an at least one value for an at least one first variable; and substituting an at least one reference to a second variable with a reference to a third variable, the third variable comprising the first variable and a relative part.

Optionally, the application is an enterprise application.

Optionally, the configuration holding component associated with the computer is a registry.

Optionally, the second configuration holding component is an XML reader.

Optionally, the first variable is a predetermined path of a file or a folder, the second variable is a path of a folder, and the relative part is a relative path of a file or a folder.

Optionally, the host computer is any one of the following: a personal computer, a hand held computing device, a server.

Optionally, the application can be replaced by two or more applications, the two or more applications comprising one or more client side of a client-server application, and one or more server side of a client-server application.

Optionally, the detachable device comprises a second application.

Optionally, the detachable device comprises a configuration tool for configuring one of the following: a desktop appearance associated with the host computer; one or more icons available on the desktop; one or more favorite Internet sites associated with one or more users of the device or of associated devices; or one or more history Internet sites associated with one or more users of the device or of associated devices.

Optionally, the application can operate in a semi-connected mode and occasionally update or receive updates from one or more other applications.

There is thus provided in accordance with an exemplary embodiment of the invention a computer readable medium including computing instructions for enabling one or more applications to run from a detachable device attached to a host computer, said detachable device can be detached from the host computer and used as a storage device, the instructions for substituting one or more calls made by the application, from a call to a first configuration holding component associated with the host computer, to a call to a second configuration holding component.

There is thus provided in accordance with an exemplary embodiment of the invention a computer readable medium including computing instructions for enabling one or more applications to run from a detachable device attached to a host computer, said detachable device can be detached from the host computer and used as a storage device, the instructions comprising for receiving one or more values for at least one first variable; and substituting one or more references to at least one second variable with a reference to a third variable, the third variable comprising the first variable and a relative part.

BRIEF DESCRIPTION OF THE DRAWINGS

Non-limiting embodiments of the invention will be described with reference to the following description of exemplary embodiments, in conjunction with the figures. The figures are generally not shown to scale and any sizes are only meant to be exemplary and not necessarily limiting. In the figures, identical structures, elements or parts that appear in more than one figure are preferably labeled with a same or similar number in all the figures in which they appear, in which:

FIGS. 3B and 3C show an XML file and a binary file, used as a registry substitute, in accordance with the preferred embodiment of the disclosed invention;

DETAILED DESCRIPTION OF THE PREFERRED EMBODIMENT

Figure 1A:
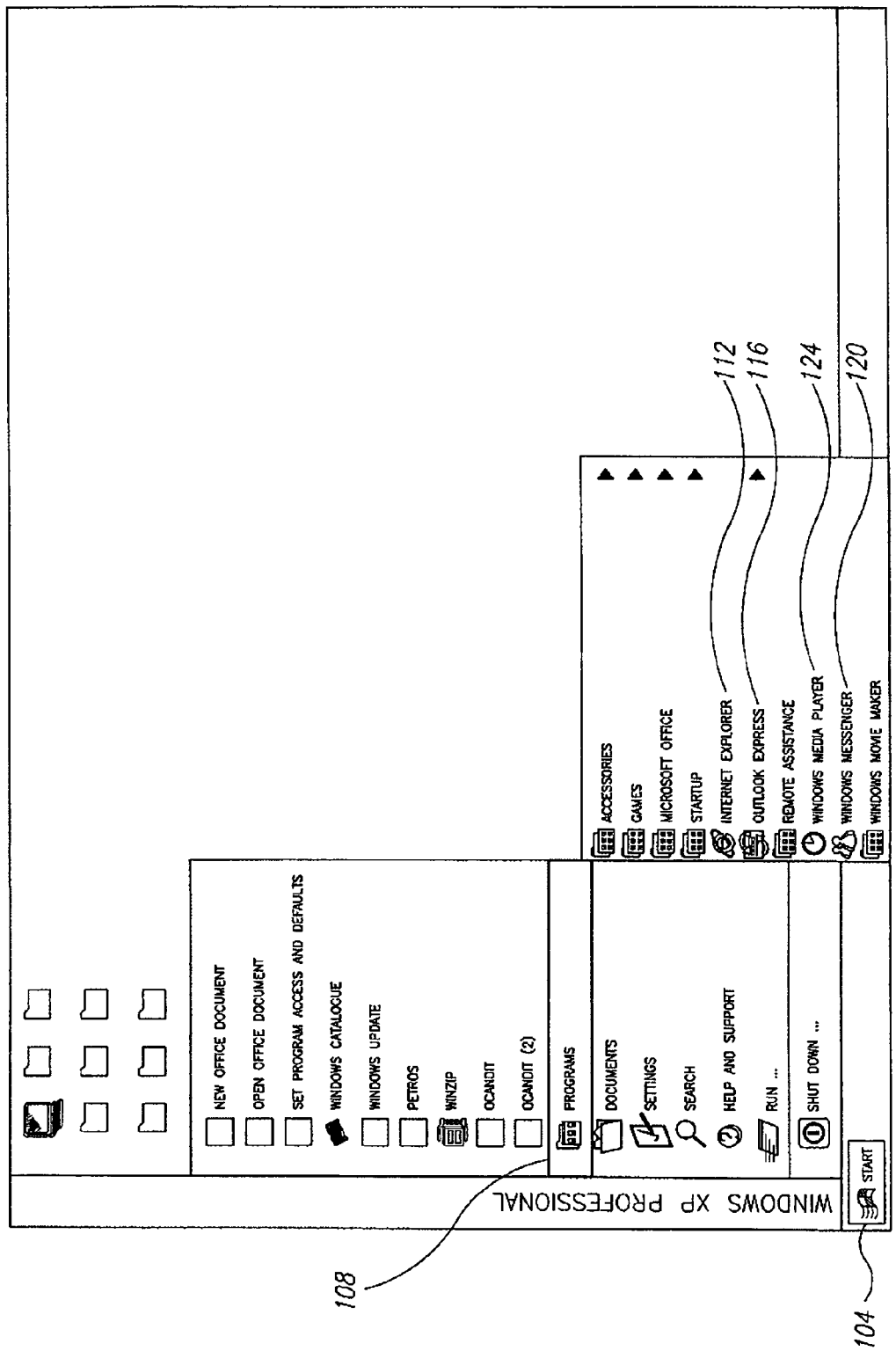
FIG. 1A is a screenshot showing the programs installed on a personal computer.

The present invention overcomes the disadvantages of the prior art by providing a novel solution which enhances and adds to the capabilities of currently available smart drives, by enabling enterprise applications to run from such drives.

In this context, the term smart drive relates to a detachable device, used not only as storage but also as a platform for running one or more applications. The term application relates to software, comprising one or more executable files, modules, DLLS, or other packages comprising instructions for a general purpose computer. The instructions can be in machine code, in any programming language, and developed using any development environment. Such applications often involve the usage of one or more databases, which require a long and complex installation.

The present invention addresses the two main barriers eliminating the deployment of enterprise applications from a smart drive. Eliminating these problems will typically enable a prospective user to receive and immediately begin using such applications within a small or medium business. Employing such solution will typically save a long installation and assimilation of an application thus decreasing the time to market (TTM), time to value (TTV), and total cost of ownership (TCO). Reducing the TTM, TTV and TCO will increase the willingness of a user to at least try such product.

The first problem to be eliminated is the usage of the registry mechanism. Since writing to certain areas in the registry requires administrator privileges which are not always given to a user. The usage of the registry is eliminated by substituting the addressing of all the variables or other parameters that are usually placed in the registry, in addressing another hierarchical structure, such as one or more XML files. Thus all reading or writing of such parameters, including configuration, installation, options and other parameters or values related to the application are done with regard to the one or more hierarchical files (such as XML files) which are not part of the computer's registry. Rather, these files are created on ad hoc basis to be used during the deployment, execution and life of the applications residing on the smart drive. For that end, a mechanism of reading and writing to and from a hierarchical structure, such as an XML file is supplied, and all calls to the registry made by an application are replaced with relevant calls to the hierarchical structure. When the smart drive application is stopped, or when the smart drive is ejected or removed from the computer, the said hierarchical structure as well as any mechanism supporting the reading and writing there from or to are removed.

The other problem relates to addressing files within an application, whether files related to the application as supplied by a vendor, or files comprising user's data. This problem is eliminated by using the dynamically given drive assignment of the smart drive, and by having the enterprise application working with relative paths.

Persons skilled in the art will appreciate that each solution offered above of usage of dynamically given drive assignments; enabling an enterprise application to work with relative paths; eliminating the usage of the host computer registry by enterprise applications by addressing all the variables normally saved in the registry in another hierarchical structure, can be employed concurrently or in isolation so as to enable the launch, and execution of enterprise applications from a smart drive and the smooth removal from a host computer.

Figure 1B:
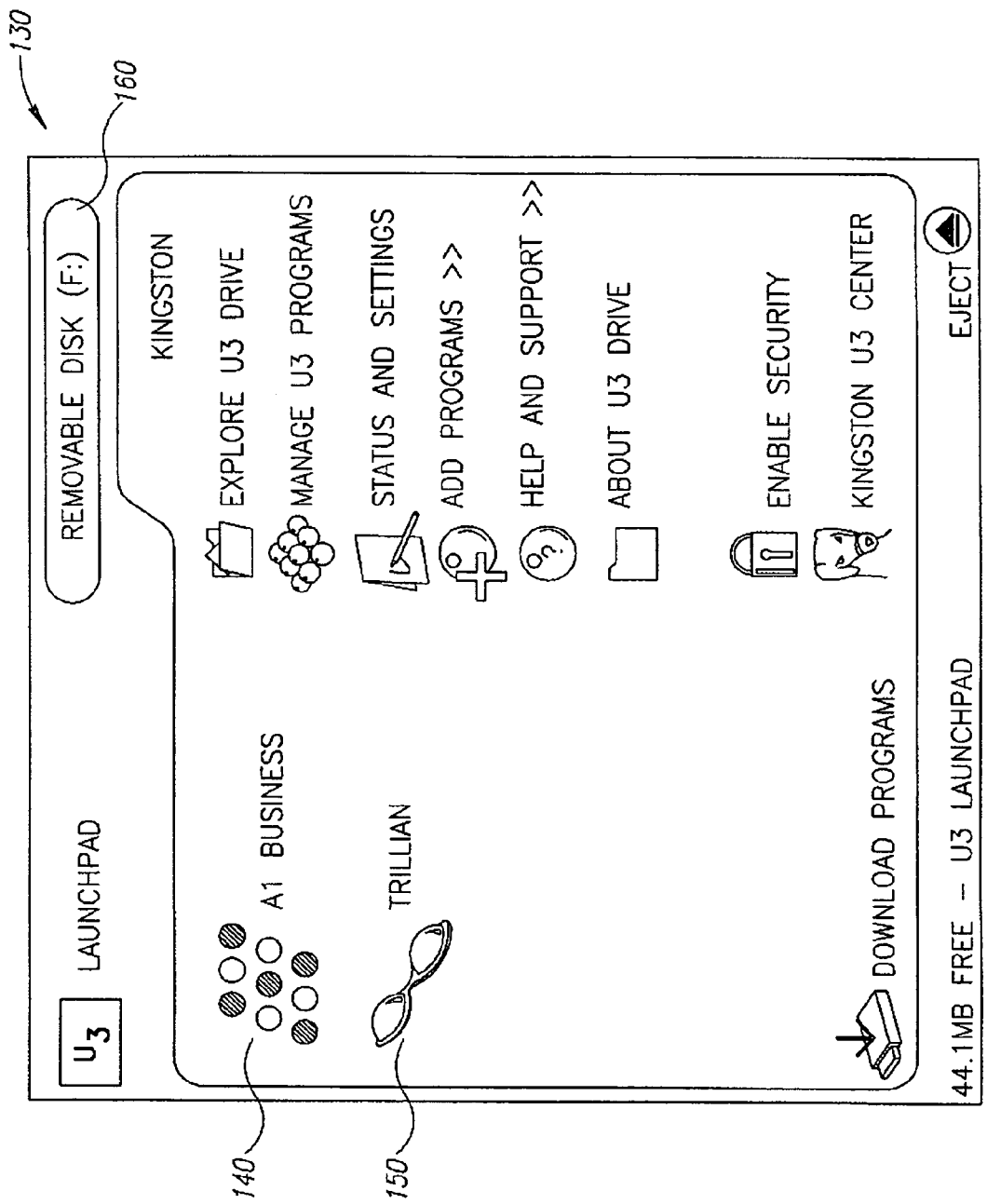
FIG. 1B is a screenshot showing the programs installed on a smart drive inserted into the personal computer of FIG. 1A.

Reference is now made to FIG. 1A and FIG. 1B. FIG. 1A shows a screenshot of a typical and exemplary host computer to which a smart drive has been connected and launched, with the Start button 104 pressed, and program option 108 selected. The exemplary host computer has installed Microsoft Internet Explorer 112, Microsoft Office Outlook 116, MSN messenger 120 and Windows media player 124. Persons skilled in the art will appreciate that many other types of host computers employing various operating systems and many different applications can be used in connection with the present invention, and that the present exemplary host computer is shown for the purpose of illustration and not limitation.

FIG. 1B shows a smart drive launcher window that opens when a smart drive is inserted into the appropriate receptacle associated with the host computer. The exemplary smart drive is a USB or like device comprising a launcher which is a computer program stored on the smart drive, and which enables the user to launch applications and other services via the smart drive. In the exemplary embodiment of the present invention, the launcher window, generally referenced 130, opens once the launcher is executed and loaded into the memory of the host computer, comprises on the right hand side a list of options, and on the left hand side the applications installed on the drive and available for the user's use. In the exemplary embodiment shown in FIG. 1B, the applications shown include "A1 business" 140 and "Trillian" 150. As shown in FIG. 1A, none of applications 140 or 150 is installed on the host computer and are therefore enabled only through their launch from the smart drive. In the exemplary embodiment, when launched the applications 140 and 150 will be executed on the memory of host computer. When the smart drive is removed from the host computer, applications 140 and 150 are removed from the memory of the host computer and are not available any longer to users of the host computer. Data associated with applications 140 and 150 is also removed from the host computer, without leaving a trace.

Figure 2A:
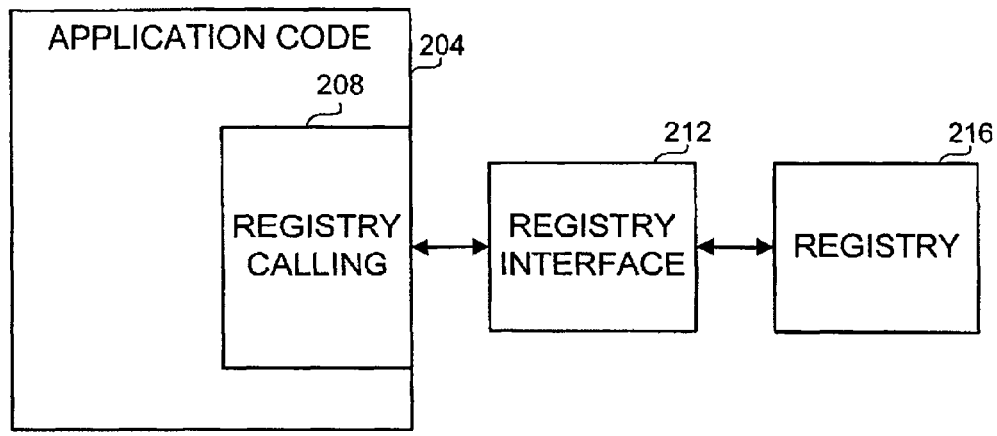
FIG. 2A is a block diagram of the general structure of a program working with the registry.
Figure 2B:
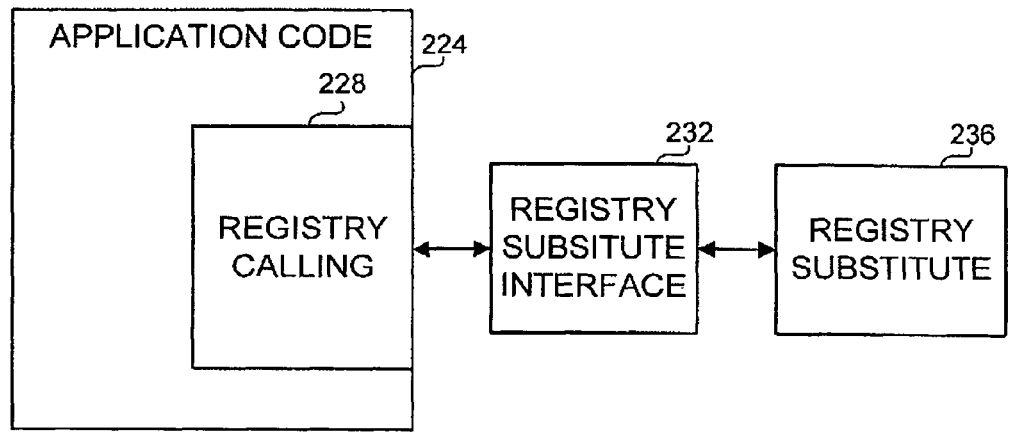
FIG. 2B is a block diagram of the general structure of a program working with a registry substitute, in accordance with a preferred embodiment of the disclosed invention.

Reference is now made to FIG. 2A and FIG. 2B, showing the differences between an application using the registry and an application using a registry substitute, in accordance with a preferred embodiment of the disclosed invention. The registry substitute can be implemented in the exemplary embodiment of the present invention as a file having a hierarchical structure. Both the registry and the registry-substitute are used as configuration-holding components. However, the registry strongly depends on the user identity, while the substitute does not. FIG. 2A depicts a block diagram of an application using the registry. Application 204 comprises one ore more locations 208 in the code that address registry 216. Application 204 can address any entity in the registry, as long as the registry is not associated with another user. Registry addressing, whether related to storing or retrieving values from the registry, is preferably performed through a registry interface 212. Registry interface 212 can preferably be a part of application code 204, or a separate application provided as a DLL, a static library or another component. In the preferred embodiment, registry interface 212 stores or retrieves information in registry 216, according to the user's privileges, or other predetermined rules. Optionally, registry interface 212 is omitted and registry calling code 208 calls the registry directly.

FIG. 2B shows an alternative implementation of the application, without referring to the registry, in accordance with another preferred embodiment of the present invention. As shown in FIG. 2B, instead of the registry, a registry substitute 236 is used. Registry substitute 236 can be implemented by any hierarchical structure, such as an XML file, a folder tree, a "black box" dedicated product providing a hierarchical structure using an internal implementation, or the like. Application code 224 provides the same functionality as application 204. However, registry calling code 208 of application 204, which calls one or more routines, methods, or other units of registry interface 212, are replaced by code calling routines, methods or other units of registry substitute interface 232, which stores or retrieves data from registry substitute 236. Optionally, registry substitute 232 provides registry calling code 228 with the same interface as provided by registry interface 212. Such identity provides seamless substitution of registry interface 212 and registry 216 with registry substitute interface 232 and registry substitute 236, without any changes to application code 204.

Figure 3A:
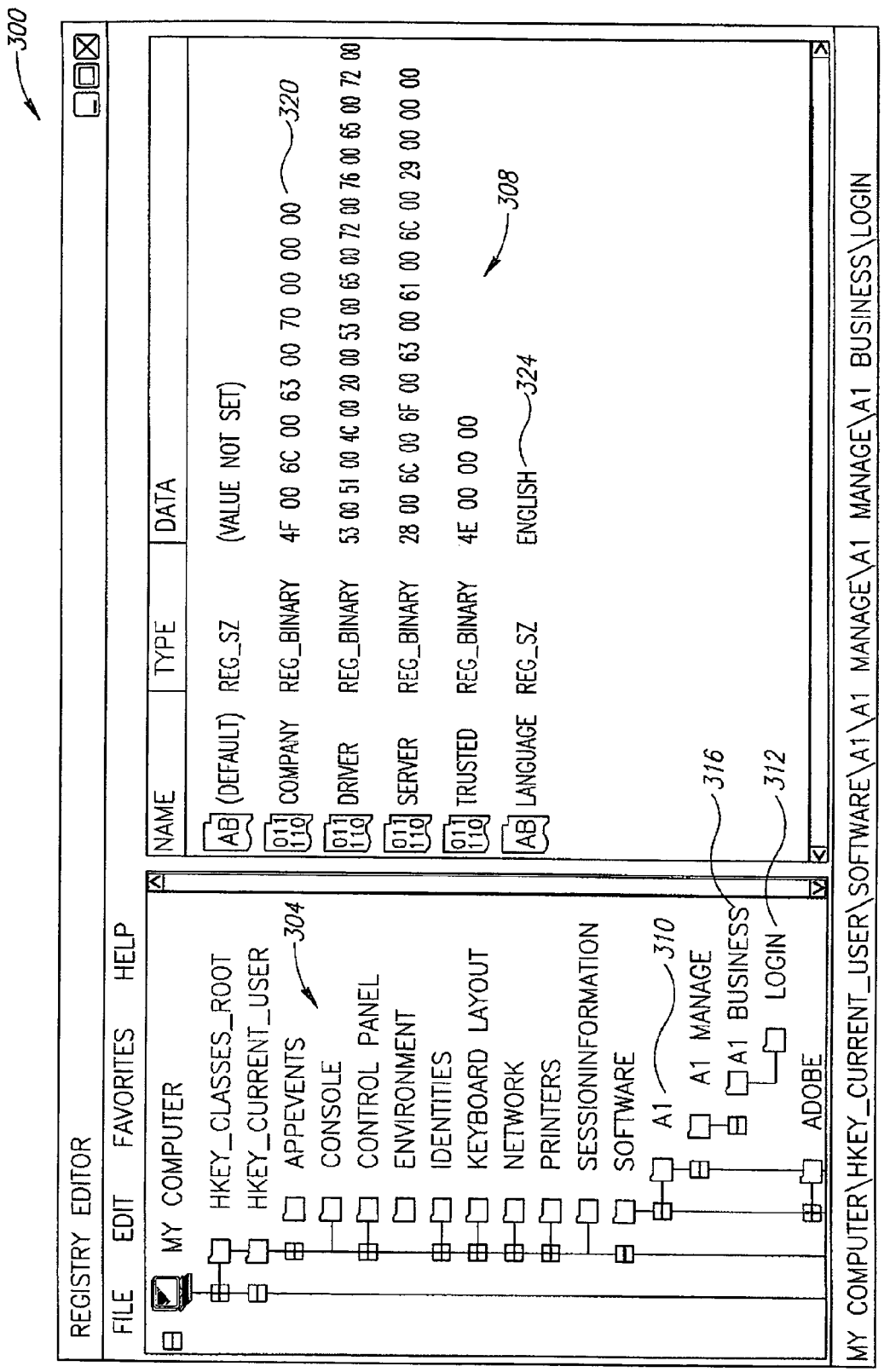
FIG. 3A shows a fraction of a registry of a computer running an enterprise solution.

Referring now to FIGS. 3A, 3B, and 3C showing a section of a registry and a section of a registry substitute, in accordance with a preferred embodiment of the present invention. FIG. 3A shows a screen shot of the registry editor of the Microsoft Windows operating system, generally referenced 300 and a part of the registry of a host computer, on which an application named "A1" is installed, in accordance with an exemplary embodiment of the present invention. Preferably, during the installation of the application, registry entries are added to the installed host computer. Registry editor 300 uses a representation similar to folders and files. The left hand side pane of editor 300, generally referenced 304 comprises a hierarchical structure of entries, wherein each entry can contain additional entries listed underneath the entry, or values, listed on the right hand side pane 308 of editor 300. For example, the registry shown in FIG. 3A has installed "A1" hierarchy 310 under the "Software" logical section, comprising "A1 business" logical section 316 and "LogIN" logical section 312. Logical sections in the registry are also known as Hive Keys. In use, when a user selects an entry by using a pointing device such as a mouse, or a keyboard, on the left hand side, for example "LogIN" 312, a list of registry entries and values (keys) associated with the selection is presented in the pane 308. In FIG. 3A, the values include "Company" 320, "Language" 324 and additional values associates with registry keys. Yet additional values are associated for example with "A1 business" entry 316, but are not visible in FIG. 3A. Many additional values may be assigned to each entry. Referring now to FIG. 3B, showing a listing of an XML file, generally referenced 340, used as a registry substitute for the traditional registry, in accordance with a preferred embodiment of the present invention. Similarly to the registry, an XML file preferably provides a hierarchical structure. The listing shown in FIG. 3B comprises entries 342 associated with the "A1" installation under the "Software" hive key. Similarly to the registry, the XML file comprises entries and values associated with "LogIN" 344, such as "Company" 348 and "Language" 352. However, the value shown for entry "Company" 348, is binary, as shown in entry 320 in FIG. 3A. In an exemplary embodiment of the present invention, instead of incorporating a binary value into an XML file, entry 348 comprises a reference to a file comprising the relevant data, in this case LogIN-Company, binary file, the listing of which is shown in FIG. 3C. FIGS. 3A, 3B and 3C show an exemplary way of substituting the built-in registry of the Microsoft Windows operating system with another hierarchical structure. It will be appreciated that additional structures can be used for representing a hierarchical structure of values. An XML representation has an advantage of having available multiple third party products for reading and writing a hierarchical structure. However, any other like structure or a structure that may accomplish the goals and purposes of the invention can be similarly used in accordance with the teaching of the present invention.

Figure 4:
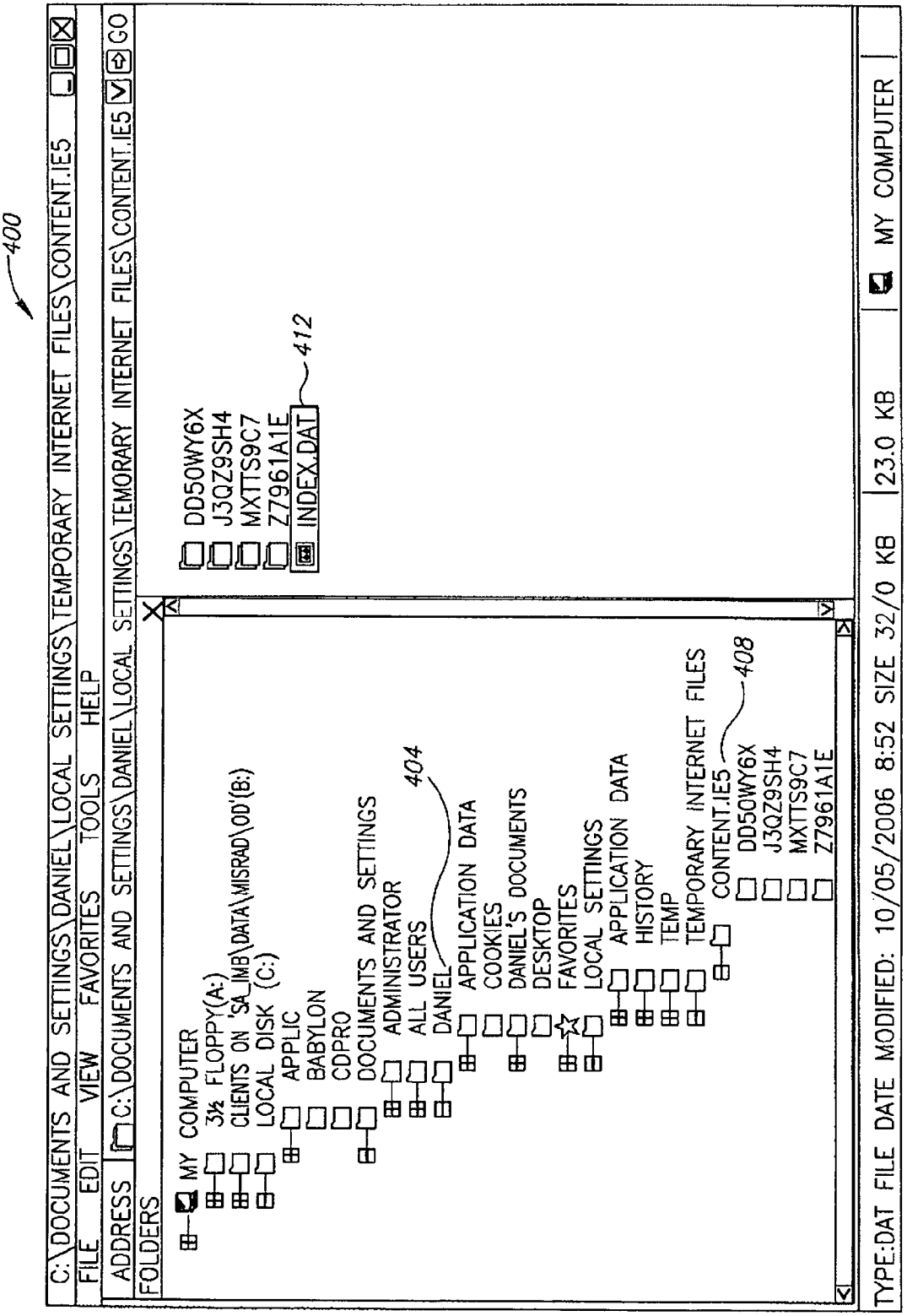
FIG. 4 shows a listing of a folder and a full path of a file.

Referring now to FIG. 4, showing a Microsoft Windows Explorer generally referenced 400. The folder hierarchy under drive c: comprises a folder named DANIEL 404, underneath which there is a folder named Content.IE5 408. Folder Content.IE5 (408) comprises a file titled index.dat 412. The file index.dat 412 can be referenced as "C:\Documents and Settings\daniel\Local Settings\Temporary Internet Files\Content.IE5 index.dat". However, if the same structure currently installed under user "daniel" is installed under a different user, for example "Jonathan", the full path will have to be specified, i.e. "C:\Documents and Settings\Jonathan\Local Settings\Temporary Internet Files\Content.IE5\index.dat". Alternatively, relative paths can be used. Thus, according to the teaching of the present invention, a reference to a variable such as a file name will be substituted with a reference comprising one or more parts, wherein one part is fixed, and optional additional one or more parts are relative to the fixed parts. Thus, in the current example, the file name can be constructed of three parts: the first part is a dynamically assigned drive indication, such as "C:\", "F:\" or any other drive indication indicating which letter the smart drive is assigned. This indication is fixed, since it depends on a factor which is external to a file or to an application the file is associated with. The second part is a user folder, which indicates a path relative to a folder, for example "Documents and Settings\daniel\", or "Documents and Settings\Jonathan\". The third part indicates the location of a file relatively to the user folder, such as "Local Settings\Temporary Internet Files\Content.IE5index.dat". Thus, when the enterprise application launched from the smart drive is required to relate to a variable such as a file, it can retrieve or otherwise receive one or more values representing one or more parts of the variable, being the file's path in the current example, from a location, such as the registry or registry substitution file described above, and then concatenate or otherwise combine the retrieved value with a relative part to complete the full variable, e.g. the full file path of the required file. Thus, the file mentioned above can be constructed of a drive indication being "C:\", a user folder being "Documents and Settings\daniel\", and a relative file path "Local Settings\Temporary Internet Files\Content.IE5\index.dat", together completing the file name. If, at another time the drive is assigned a different letter, or a different user is using the application, the file name is constructed in the same manner but leads to another file, relevant to the new conditions. A person skilled in the art will appreciate that the proposed scheme can be used with zero, one or more fixed parts, and zero, one or more relative parts. Each of the fixed or the relative parts can be hard coded, retrieved from storage, drawn from the operating system or another component of the host computer, or otherwise obtained. Thus, a reference to a file can be constructed from individually retrieved parts, which when combined provide a full path that is adapted according to the specific settings of the system.

Figure 5:
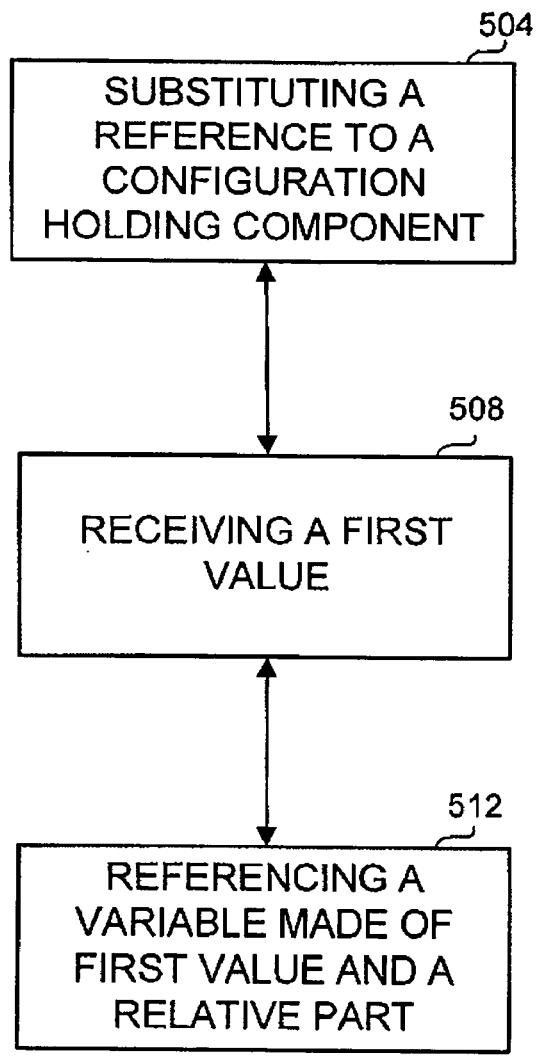
FIG. 5 shows a flowchart of the steps associated with the disclosed method.

The usage of the two mechanisms described above, being the registry substitution and relative path, eliminate two factors which complicate the installation of an application in general, and enterprise applications in particular. FIG. 5 is a flowchart depicting the steps associated with implementing the method for enabling an enterprise application to run from a smart drive, in accordance with the preferred embodiment of the present invention. At step 504, a reference to an existing configuration holding component, such as the registry is replaced by reference to another configuration holding component, which is preferably independent from administrator privileges. This step is preferably repeated for all references to such components, in order to eliminate the dependency on such privileges. At step 508, an at least one value is retrieved from a configuration holding component, from the operating system or from any other source. At step 512, the retrieved value is used as a fixed part in a reference to a variable, together with a relative part. The relative part of the reference can also be retrieved from an external source, but can also be hard coded in the application.

Eliminating the factors of relative file path or other parameters, and accessing a configuration-holding mechanism, enables the installation of a solution comprising one or more applications on a detachable drive and executing the applications directly from the drive. Such installation and execution does not require access to the registry of the host computer, reliance on specific drive assignments, or reliance on specific user privileges. Enterprise applications typically require access and usage of one or more databases. Database applications are often implemented as client-server applications. Both the server side and the client side of an application can be implemented according to the schemes suggested above, and thus be used in a portable manner. Further, the server and client sides of a database application can be installed and executed from the same device, thus offering complete portability to a single client (although the access of other clients to the server will be limited to those times in which the server side is executed). Offering these two mechanisms enable the immediate deployment of enterprise applications from a smart drive, thus eliminating the need of complex installations or administrator privileges. Such deployment provides a significant decrease in the time-to-value and time-to-market experienced by a user, and reduces the total cost of ownership, since a significant part of the installation process is eliminated.

The proposed method and apparatus enable innovative uses which present vendors with new markets and market segments. The ability to have plug-and-play devices greatly promotes the mobility, productivity and versatility of workers. For example, a vendor can upload a pre-installed product to an Internet site, and then a user can download the product. From the site to his or her own device, and start using the product immediately. Such site can be associated with a vendor, or a general repository, for example a U3 repository, from which clients can download software products suitable for the device manufactured by multiple vendors. The products can include simple applications, communication applications, productivity tools, business applications and other applications. The user can download the specific version that fits her needs, budget, role or any other parameter. The user can start with downloading an evaluation or promotional version, and if he is fond of the product proceed with downloading a paid version. Using this mechanism, a vendor can distribute generally available (GA) versions, trial versions, versions specific for a certain operating system, software patches or updates, or the like. If a vendor is aiming at one or more specific verticals or market segments, a user can download a pre-installed and pre-configured product, having the relevant meta data, structure, tables, information, or the like and start using it without further adaptations or preparations, thus practically eliminating the time to value.

The proposed solution can promote the concept of hot-seat, wherein a company keeps a number of computers for general use of employees rather than a computer for each employee. Then, an employee arriving to the company's premises takes any available computer and works using his or her own device. This arrangement is particularly useful, for example, for an organization employing multiple sales people who spend only a fraction of their time at the company's offices and can thus share computers and offices with other people. Mobility of workers is also enhanced using this solution. All a worker needs to carry is the smart drive, and the he or she can work anywhere, including home, airports, alternative sites of the company, etc.

Yet another usage can be installing all relevant applications related to a product, and in particular both the client and the server sides of a client-server application used by a small business. Thus, a person can carry all the information related to a business on a smart device, have it available anywhere and anytime on any computer, and promote security. Alternatively, the server side can be installed in a permanent location, and multiple persons can be equipped with a smart drive installed with the client side and work from varying locations.

Further usage can include pre-installing a configuration tool on a smart drive, such that once a user attaches the drive to a computer, the whole look-and-feel of the computer changes according to the user's preferences. The look-and-feel includes the user's desktop, including the desktop's appearance and available icons, favorite internet sites of the user, history internet sites of the users, or the like. The drive can further include available business applications, presentations, music or multi-media resources, games, and other relevant applications or data. Alternatively, a drive can be supplied with a complete installed suite of applications, including personal productivity tools, business applications, multi-media players, and the like, thus enabling a person to buy such a drive and start using it on any computer. If the person has access to computers at desired locations, such purchase can replace a purchase of a personal or a laptop computer.

Yet another exemplary usage of the present invention can be made in a semi-connected working mode. In such exemplary mode, a worker can perform significant portions of his or her work using only the client side of an application, as installed on the smart drive. Occasionally, when connection to the server side is available, the client application synchronizes with the server application, update the changes the worker has done using the client side, and possibly receive updates performed either directly on the server side, or by other clients since the last communication. Such working mode is preferably suitable, for example, to a development worker such as a person configuring, constructing, or adjusting an application, with or without the usage of a development environment. Such worker can attach his or her device to any computer, including a computer which is not connected to a network; develop the application, including actions such as adding tables, procedures, macros or the like. Once the developer has completed the task, the application can connect to and synchronize with a server side of the application and exchange updates. Other workers who are likely to spend a significant portion of their time disconnected from the server, such as sales or marketing personnel, traveling agents, managers, or others can also work in like semi-connected mode and synchronize occasionally with the server. The synchronization can be performed by the server side being aware and keeping track of the clients connected there to. In an exemplary embodiment of the invention, once a client disconnects from the server, the server opens a "keep alive" log, in which update to the application are stored. Optionally, the next time the same client connects to the server such client's device is updated with all the changes that occurred since the disconnection. When there is a conflict, such as one ore more entities that were changed at the client side and/or at the server side, a dedicated component for identifying and handling conflicts is operated. Such component can, for example, incorporate the latest change and notify the client who performed those changes that were abandoned.

It will be apparent to a person of ordinary skill in the art that the disclosed invention relates to modifications required for running enterprise software form a removable drive, including the implementation of a substitute to a holding mechanisms such as a registry, and the implementation of relative values of variables such as file names. Thus, the invention is not limited to being used on a specific type of c computer or a specific operating system and can be used on platforms such as Microsoft Windows XP, Linux, Apple Macintosh, Microsoft .NET environment or other systems currently known or that will become known in the future. The invention can be implemented for any memory card, USB flash drive or mobile, including exemplary products such as SanDisk SD card, SanDisk XD card, Mini-SD, SanDisk memory stick, SanDisk Cruzer, SanDisk memory stick, all from SanDisk Corporation located at Milpitas, Calif. The invention can be implemented in other memory storage devices and is not limited to smart drives. Additionally, other technologies can be used, including different removable technologies such as CD-ROM, DVD-ROM, or others, for example for booting the host computer from a CD-ROM.

In yet another alternative, the disclosed invention can be used for running applications from a remote device, for example by using a wireless communication protocol, such as wireless LAN, wireless WAN, Wi-Fi, Wi-Max, Bluetooth or others, now existing or later developed. A configurator component of the hosting computer can then run an application installed on a remote device, without requiring a user to insert the device into the computer.

It will be apparent to a person of ordinary skill in the art that multiple additional applications, uses and usage modes exist for smart drives, as well as other drives and storage devices. Once the option to run complex applications on a smart drive or other storage devices is enabled, there is practically no limit to the uses that can be derived from such devices.

It will be appreciated by persons skilled in the art that the present invention is not limited to what has been particularly shown and described hereinabove. Rather the scope of the present invention is defined only by the claims which follow.

The invention claimed is:

1. A method, comprising:
   detecting that a detachable storage device is physically coupled to a host computer, wherein detachable storage device stores an enterprise application and does not include a processor and further wherein the host computer (i) has a processor, memory, and a locally stored registry and (ii) does not have the enterprise application installed;
   launching, by the processor of the host computer in the memory of the host computer, the enterprise application from the detachable storage device;

intercepting, at a registry substitute interface, a call to the locally stored registry made by the enterprise application;

replacing, at the registry substitute interface, the call to the locally stored registry with a call to a registry substitute stored on the detachable storage device; and returning, from the registry substitute interface to the enterprise application, a configuration value retrieved from the registry substitute, wherein said intercepting, replacing, and returning enable the enterprise application to be executed at the host computer without altering the locally stored registry of the host computer as it existed prior to said detecting.

2. The method of claim 1 wherein the registry substitute is a hierarchical structure.

3. The method of claim 2 wherein the hierarchical structure is an XML file.

4. The method of claim 2 further comprising the step of removing the detachable device from the host computer and subsequently removing the hierarchical structure and any data related to the enterprise application from the host computer.

5. The method of claim 2 wherein the hierarchical structure comprises a reference to a file comprising relevant data.

6. The method of claim 1 further comprising the step of dynamically assigning a drive indication to the detachable device.

7. The method of claim 6 wherein an at least one reference to a variable is substituted with a reference to the dynamically assigned drive indication.

8. The method of claim 6 wherein an at least one reference to a variable is substituted with a reference to the dynamically assigned drive indication combined with a relative part.

9. The method of claim 8 wherein the relative part is a relative file path.

10. The method of claim 8 wherein the variable is a file location or a part of a file location.

11. The method of claim 1 wherein the enterprise application is a client-server application associated with one or more databases.

12. An apparatus, comprising:
a host computer, including:
a processor,
memory, and
a locally stored registry, wherein the host computer does not have an enterprise application installed therein;
a detachable storage device physically coupled to the host computer, wherein the detachable storage device includes a processor and stores the enterprise application, and further wherein the enterprise application is executed, by the processor of the host computer in the memory of the host computer, from the detachable storage device; and
a registry substitute interface to (i) intercept a call to the locally stored registry made by the enterprise application, (ii) replace the call to the locally stored registry with a call to a registry substitute stored on the detachable storage device, and (iii) return to the enterprise application a configuration value retrieved from the registry substitute, wherein said intercepting, replacing, and returning enable the enterprise application to be executed at the host computer without altering the locally stored registry.

13. The apparatus of claim 12 wherein the host computer is any one of the following: a personal computer, a hand held computing device, or a server.

14. The apparatus of claim 12 wherein the detachable storage device further stores a second application.

15. The apparatus of claim 12 wherein the detachable storage device further stores a configuration tool for configuring at least one of the following: a desktop appearance associated with the host computer; an at least one icon available on the desktop; an at least one favorite internet site associated with a user of the device; or an at least one history internet sites associated with a user of the device.

16. A non-transitory computer readable medium including computing instructions, wherein execution of the computing instructions by an execution apparatus causes the execution apparatus to perform a method, the method comprising:

detecting that a detachable storage device is physically coupled to a host computer, wherein detachable storage device stores an enterprise application and does not include a processor and further wherein the host computer (i) has a processor, memory, and a locally stored registry and (ii) does not have the enterprise application installed;

launching, by the processor of the host computer in the memory of the host computer, the enterprise application from the detachable storage device;

intercepting, at a registry substitute interface, a call to the locally stored registry made by the enterprise application;

replacing, at the registry substitute interface, the call to the locally stored registry with a call to a registry substitute stored on the detachable storage device; and returning, from the registry substitute interface to the enterprise application, a configuration value retrieved from the registry substitute, wherein said intercepting, replacing, and returning enable the enterprise application to be executed at the host computer without altering the locally stored registry of the host computer as it existed prior to said detecting.

* * * * *